United States Patent Office 3,707,538
Patented Dec. 26, 1972

3,707,538
1,5,7-TRISUBSTITUTED-3-HYDROXY-1H-1,5-
BENZODIAZEPINE-2,4-[3H,5H]-DIONES
Karl-Heinz Weber, Gau-Algesheim, Adolf Bauer, Ingelheim am Rhein, Peter Danneberg, Ockenheim, Klaus Minck, Gau-Algesheim, and Karl-Heinz Pook, Ingelheim am Rhein, Germany, assignors to Boehringer Ingelheim G.m.b.H., Ingelheim am Rhein, Germany
No Drawing. Continuation-in-part of application Ser. No. 193,181, Oct. 27, 1971. This application Jan. 26, 1972, Ser. No. 221,046
Claims priority, application Germany, Nov. 2, 1970, P 20 53 681.6; Jan. 27, 1971, P 21 03 745.6
Int. Cl. C07d 53/04
U.S. Cl. 260—239.3 B                    8 Claims

ABSTRACT OF THE DISCLOSURE

Compounds of the formula

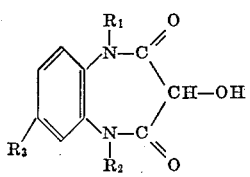

wherein
 $R_1$ is hydrogen, straight or branched alkyl of 1 to 4 carbon atoms, ω-hydroxy-(alkyl of 1 to 4 carbon atoms) or allyl,
 $R_2$ is phenyl, halo-phenyl, trifluoromethyl-phenyl, nitrophenyl or pyridyl, and
 $R_3$ is chlorine, bromine, fluorine, trifluoromethyl or nitro;
the compounds are useful as tranquilizers and anticonvulsives.

---

This is a continuation-in-part of copending application Ser. No. 193,181, filed Oct. 27, 1971.

This invention relates to novel 5,7-disubstituted- and 1,5,7 - trisubstituted-3-hydroxy-1H-1,5-benzodiazepine-2, 4-[3H,5H]-diones, as well as to methods of preparing these compounds.

More particularly, the present invention relates to a novel class of 3-hydroxy-1H-1,5-benzodiazepine-2,4-[3H, 5H]-diones represented by the formula

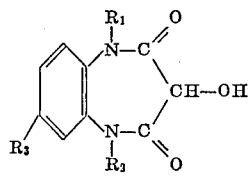

wherein
 $R_1$ is hydrogen, straight or branched alkyl of 1 to 4 carbon atoms, ω-hydroxy-(alkyl of 1 to 4 carbon atoms) or allyl,
 $R_2$ is phenyl, halo-phenyl, trifluoromethyl-phenyl, nitrophenyl or pyridyl, and
 $R_3$ is chlorine, bromine, fluorine trifluoromethyl or nitro.

The compounds embraced by Formula I may be prepared by the following methods:

Method A

By reducing a 1H-1,5-benzodiazepine-2,3,4-[3H,5H]-trione of the formula

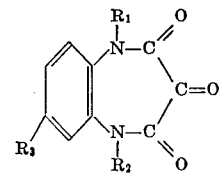

wherein $R_1$, $R_2$ and $R_3$ have the same meanings as in Formula I, or a hydrate thereof.

The reduction may be effected with nascent hydrogen generated, for example, by a mixture of zinc and glacial acetic acid or tin and hydrochloric acid, preferably at elevated temperatures; it may, however, also be effected by catalytic hydrogenation or with sodium borohydride.

The starting compounds of the Formula II for this method are themselves novel; they and a method for their preparation are disclosed in the copending application Ser. No. 221,072 of Adolf Bauer, Karl-Heinz Weber, Peter Danneberg and Klaus Minck entitled "3,3-Dihydroxy-5-Aryl-1H-1,5-Benzodiazepine-2,4-[3H,5H]-Diones and Their Anhydrous 2,3,4-Trione Form" filed on Jan. 26, 1972.

Method B

By mild oxidation of a 3 - aminomethylidene-1H-1,5-benzodiazepine-2,4-[3H,5H]-dione of the formula

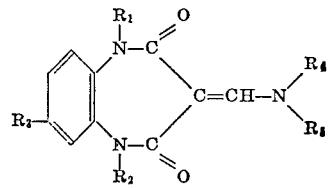

wherein $R_1$, $R_2$ and $R_3$ have the same meanings as in Formula I and $R_4$ and $R_5$, which may be identical to or different from each other, are each hydrogen or straight or branched alkyl of 1 to 4 carbon atoms, at very low temperatures in a weakly acid medium with an oxidizing agent, such as potassium permanganate or chromic acid.

The starting compounds of the Formula III for this method are also novel; they may be prepared by a novel process which is also part of the present invention and comprises reacting a 1H-1,5-benzodiazepine-2,4-[3H,5H]-dione of the formula

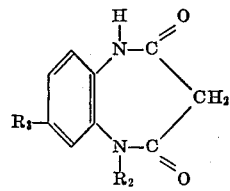

wherein $R_2$ and $R_3$ have the same meanings as in Formula I, with a phosphorus pentahalide and a dialkylformamide for a prolonged period of time at a temperature ranging from slightly below room temperature to moderately elevated temperatures, optionally adding to the reaction mixture an amine of the formula

wherein $R_4$ and $R_5$ have the same meanings as in Formula III, and optionally converting the reaction product thus obtained into an acid addition salt thereof by conventional methods.

The novel process according to the present invention is based on the discovery that a dialkylamino group can be introduced in the 3-position of the benzodiazepinedione of the Formula IV by reaction thereof with a phosphorus pentahalide and a dialkylformamide, and that this dialkylamino group can be exchanged for an amino group of the formula —$NR_4R_5$, if desired.

The reaction pursuant to the instant invention is unexpected and surprising inasmuch as the reaction of a compound of the Formula IV with a phosphorus pentahalide and a dialkylformamide, i.e. under strongly acid conditions, and subsequent addition of an amine of the Formula V would have been expected to yield a compound of the formula

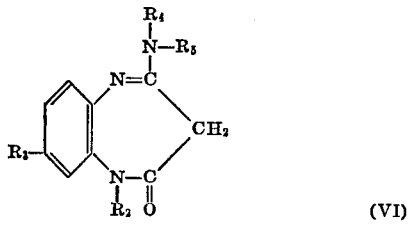

(VI)

wherein $R_2$, $R_3$, $R_4$ and $R_5$ have the meanings previously defined. In actuality, we have found, however, that a compound of the Formula VI is indeed formed when a compound of the Formula II is reacted with a phosphorus pentahalide and a dialkylformamide and the intermediate imide-halide of the formula

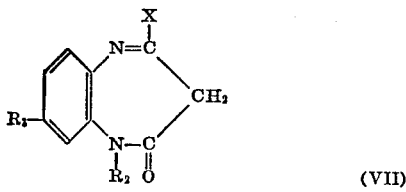

(VII)

where $R_2$ and $R_3$ have the meanings previously defined and X is halogen, which is formed after a short reaction time, is contacted with an amine of the Formula V. On the other hand, however, if a compound of the Formula IV is allowed to react with a phosphorus pentahalide and a dialkylformamide for a prolonged period of time, such as about one hour or longer, and the amine of the Formula V is then optionally added to the reaction mixture, a compound of the Formula III is formed, wherein $R_1$ is hydrogen.

While it is possible to obtain the desired compound of the Formula III directly by merely reacting a compound of the Formula IV with a phosphorus pentahalide and the corresponding dialkylformamide, we have discovered that in many instances it is more advantageous to use a simple dialkylformamide, such as dimethylformamide, and then add the desired amine of the Formula V, preferably in excess. In the latter case an end product is formed in which the simple dialkylamino radical initially introduced by the simple dialkylformamide has been displaced by the amino radical of the added amine of the Formula V.

If necessary or desirable, one may also first isolate the intermediate compound of the Formula VII, which is formed upon reaction of a compound of the Formula IV with a phosphorus pentahalide by way of the enol form of compound IV, and subsequently further react the intermediate as described above.

If $R_1$ in Formula III is to be other than hydrogen, the end product of the above-described process must subsequently be alkylated in the 1-position pursuant to conventional methods.

The end products of the Formula III are stable organic bases and may, if desired, be converted into acid addition salts with inorganic or organic acids pursuant to conventional methods.

The starting compounds of the Formula IV are known compounds and may, for example, be prepared by the methods described in Belgian Pat. No. 710,475.

Method C

By heating a 3-diazo-1H-1,5-benzodiazepine-2,4-[3H,5H]-dione of the formula

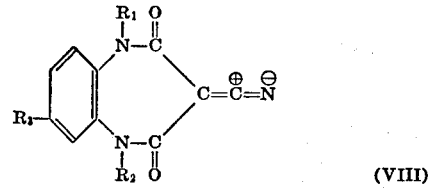

(VIII)

wherein $R_1$ has the same meanings as in Formula I except hydrogen and $R_2$ and $R_3$ have the same meanings as in Formula I, with water in the presence of a suitable inert organic solvent medium, such as acetonitrile, and in the presence of a small amount of copper powder or a copper salt.

The starting compounds of the Formula VIII for this method are also novel; they and a method for their preparation are disclosed in the copending application Ser. No. 221,071 of Karl-Heinz Weber, Adolf Bauer and Karl-Heinz Pook entitled "1,5,7-Trisubstituted-3-Diazo-1H-1,5-Benzodiazepine-2,4-[3H,5H]-Diones" filed on Jan. 26, 1972.

In those instances where methods A to C yield a compound of the Formula I wherein $R_1$ is hydrogen, this compound may, if desired, be selectively alkylated in accordance with conventional methods, for instance by first forming the corresponding 1-alkali metal salt and then reacting this salt with a conventional alkylating agent, such as an alkyl halide or a dialkyl sulfate.

Likewise, in those instances where methods A to C yield a compound of the Formula I wherein $R_1$ is hydrogen, a hydroxyalkyl group may be introduced into the 1-position by reacting the 1-unsubstituted compound with a corresponding alkyleneoxide in the presence of a strong base, such as a methanolic 35% solution of benzyl trimethyl-ammonium hydroxide (Triton B), and optionally of a suitable inert solvent medium, such as a lower alkanol, tetrahydrofuran, dimethylformamide, mixtures thereof or aqueous mixtures thereof. Another method of introducing a hydroxyalkyl group in the 1-position of a compound of the Formula I wherein $R_1$ is hydrogen consists of reacting the latter with a corresponding halo-alkanol in the presence of a weak inorganic or organic base, preferably at elevated temperatures; under certain circumstances the presence of an organic solvent, such as an alkanol, is advantageous.

By means of the above-described methods the following end products of the Formula I may be obtained:

3-hydroxy-5-phenyl-7-trifluoromethyl-1H-1,5-benzo-diazepine-2,4-[3H,5H]-dione,
7-bromo-3-hydroxy-5-phenyl-1H-1,5-benzo-diazepine-2,4-[3H,5H]-dione,
7-chloro-3-hydroxy-5-phenyl-1H-1,5-benzo-diazepine-2,4-[3H,5H]-dione,
3-hydroxy-1-methyl-5-phenyl-7-trifluoromethyl-1H-1,5-benzodiazepine-2,4-[3H,5H]-dione,
7-bromo-3-hydroxy-1-methyl-5-phenyl-1H,1,5-benzodiazepine-2,4-[3H,5H]-dione,
7-chloro-3-hydroxy-1-methyl-5-phenyl-1H,1,5-benzodiazepine-2,4-[3H,5H]-dione,
7-fluoro-3-hydroxy-1-methyl-5-phenyl-1H,1,5-benzodiazepine-2,4-[3H,5H]-dione,
3-hydroxy-1-methyl-7-nitro-5-phenyl-1H,1,5-benzodiazepine-2,4-[3H,5H]-dione,
1-ethyl-7-bromo-3-hydroxy-5-phenyl-1H,1,5-benzodiazepine-2,4-[3H,5H]-dione,
1-ethyl-3-hydroxy-5-phenyl-7-trifluoromethyl-1H,1,5-benzodiazepine-2,4-[3H,5H]-dione,
3-hydroxy-1-methyl-5-(o-trifluoromethyl-phenyl)-7-trifluoromethyl-1H-1,5-benzodiazepine-2,4-[3H,5H]-dione,
3-hydroxy-5-(o-trifluoromethyl-phenyl)-7-chloro- 1H,1,5-benzodiazepine-2,4-[3H,5H]-dione,
3-hydroxy-1-methyl-5-(m-nitro-phenyl)-7-trifluoro-
    methyl-1H-1,5-benzodiazepine-2,4-[3H,5H]-dione,
5-(p-chloro-phenyl)-3-hydroxy-1-methyl-7-trifluoro-
    methyl-1H,1,5-benzodiazepine-2,4-[3H,5H]-dione,
3-hydroxy-1-isopropyl-5-phenyl-7-trifluoromethyl-
    1H,1,5-benzodiazepine-2,4-[3H,5H]-dione,
3-hydroxy-1-(β-hydroxy-ethyl)-5-phenyl-7-trifluoro-
    methyl-1H-1,5-benzodiazepine-2,4-[3H,5H]-dione,
1-allyl-3-hydroxy-5-phenyl-7-trifluoromethyl-1H,1,5-
    benzodiazepine-2,4-[3H,5H]-dione,
5-(o-fluoro-phenyl)-3-hydroxy-1-methyl-7-trifluoro-
    methyl-1H,1,5-benzodiazepine-2,4-[3H,5H]-dione,
3-hydroxy-1-methyl-5-(o-nitro-phenyl)-7-trifluoro-
    methyl-1H-1,5-benzodiazepine-2,4-[3H,5H]-dione,
5-(o-bromo-phenyl)-7-chloro-3-hydroxy-1-methyl-
    1H-1,5-benzodiazepine-2,4-[3H,5H]-dione,
5-(o-chloro-phenyl)-3-hydroxy-1-methyl-7-trifluoro-
    methyl-1H-1,5-benzodiazepine-2,4-[3H,5H]-dione,
7-chloro-3-hydroxy-1-methyl-5-(o-trifluoromethyl-
    phenyl)-1H-1,5-benzodiazepine-2,4-[3H,5H]-dione,
5-(m-fluoro-phenyl)-3-hydroxy-1-methyl-7-trifluoro-
    methyl-1H-1,5-benzodiazepine-2,4-[3H,5H]-dione,
3-hydroxy-1-methyl-5-(m-nitro-phenyl)-7-trifluoro-
    methyl-1H-1,5-benzodiazepine-2,4-[3H,5H]-dione,
5-(p-chloro-phenyl)-3-hydroxy-1-methyl-7-trifluoro-
    methyl-1H-1,5-benzodiazepine-2,4-[3H,5H]-dione,
7-chloro-3-hydroxy-1-methyl-5-(α-pyridyl)-1H-1,5-
    benzodiazepine-2,4-[3H,5H]-dione, and
7-bromo-3-hydroxy-1-methyl-5-(α-pyridyl)-1H-1,5-
    benzodiazepine-2,4-[3H,5H]-dione.

The following examples further illustrate the present invention and will enable others skilled in the art to understand it more completely. It should be understood, however, that the invention is not limited solely to the particular examples given below.

Preparation of starting compounds of the Formula III for method B:

EXAMPLE 1

3-(n-butylamino-methylidene)-7-bromo-5-phenyl-1H-
1,5-benzodiazepine-2,4-[3H,5H]-dione 25 gm. of 7-bromo-5-phenyl-1H-1,5-benzodiazepine-2,4-[3H,5H]-dione were dissolved in 300 ml. of dimethylformamide in a 1-liter three-neck flask, the resulting solution was cooled to 10° C., and then a total of 25 gm. of solid phosphorus pentachloride were added in small portions, so that the temperature of the mixture did not rise above 15° C. The reaction mixture was then stirred at room temperature overnight, and thereafter, while cooling the reaction mixture on an ice bath, an excess of n-butylamine was added dropwise until the suspension formed thereby reacted alkaline. Subsequently, the alkaline suspension was evaporated in vacuo, and the residue was admixed with water. The crystals precipitated thereby were collected by vacuum filtration and washed with water and cold methanol, yielding 25 gm. (85.5% of theory) of the compound, M.P. 235° C. (decomp.), of the formula

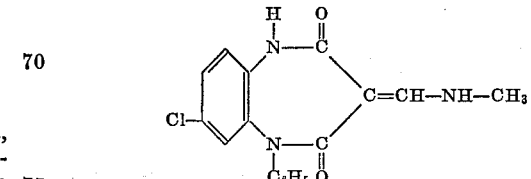

EXAMPLE 2

3-(dimethylamino-methylidene)-5-phenyl-7-chloro-1H-
1,5-benzodiazepine-2,4-[3H,5H]-dione 10 gm. of 5-phenyl-7-chloro-1H-1,5-benzodiazepine-2,4-[3H,5H]-dione were dissolved in 100 ml. of warm dimethylformamide, the resulting solution was allowed to cool to room temperature, and then, while stirring the solution, 10 gm. of phosphorus pentachloride were added, and the mixture was allowed to stand at room temperature for 15 hours (overnight). Thereafter, the reaction mixture was poured over ice, the aqueous batch was diluted with one liter of water, and the 6 N sodium hydroxide was added until the suspension formed thereby reacted alkaline. The resulting crystalline slurry was vacuum-filtered, and the filter cake was washed with water until neutral and was then taken up in methylene chloride. The methylene chloride phase was extracted twice with water, dried over magnesium sulfate and evaporated, and the residue was recrystallized from hot ethyl acetate in the presence of charcoal, yielding 8.4 gm. (70.6% of theory) of the compound, M.P. 234–235° C., of the formula

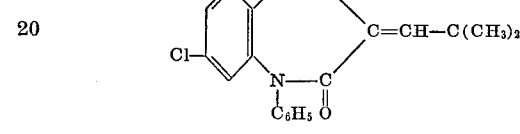

EXAMPLE 3

3-(amino-methylidene)-5-phenyl-7-nitro-1H-1,5-
benzodiazepine-2,4-[3H,5H]-dione 5 gm. of 5-phenyl - 7 - nitro-1H-1,5-benzodiazepine-2,4-[3H,5H]-dione were dissolved in 100 ml. of dimethylformamide, a total of 20 gm. of phosphorus pentachloride were added in small portions to the solution at 20° C., and the mixture was allowed to stand at room temperature for two hours. Thereafter, the reaction mixture was admixed, while cooling, with an excess of liquid ammonia in methanol until alkaline reaction. The alkaline solution was evaporated in vacuo, ice water and ammonia were added to the residue, and the crystalline precipitate formed thereby was collected by vacuum filtration and washed with water. The filter cake was taken up in ethyl acetate, the solution was extracted with water, dried over magnesium sulfate and evaporated, and the residue was recrystallized from ethyl acetate in the presence of charcoal, yielding 4.2 gm. (76.9% of theory) of the compound, M.P. 250–251° C., of the formula

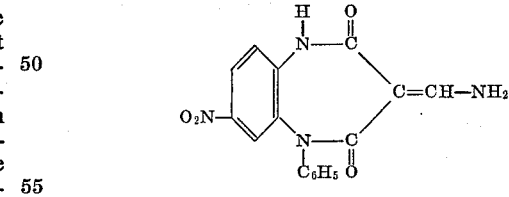

which is very sparsely soluble in 2 N hydrochloric acid, but readily soluble in semi-concentrated hydrochloric acid.

Its hydrochloride was obtained by dissolving the free base in acetone and acidifying the solution with ethereal hydrochloric acid.

EXAMPLE 4

Using a procedure analogous to that described in Example 1, 3-(methylamino-methylidene) - 5 - phenyl-7-chloro - 1,5 - benzodiazepine - 2,4 - [3H,5H]-dione, M.P. 253–254° C., of the formula

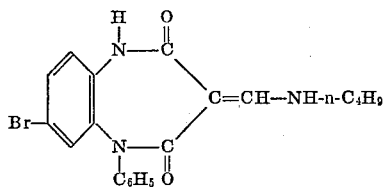

was prepared from 5-phenyl - 7 - chloro-1H-1,5-benzodiazepine-2,4-[3H,5H]-dione and methylamine.

EXAMPLE 5

Using a procedure analogous to that described in Example 1, 3-(n-butylamino-methylidene) - 5 - phenyl - 7-nitro - 1,5 - benzodiazepine - 2,4 - [3H,5H]-dione, M.P. 226–227° C., of the formula

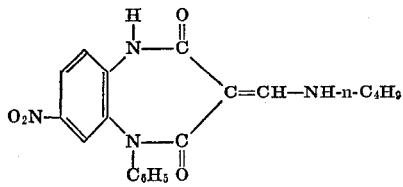

was prepared from 5 - phenyl - 7 - nitro-1H-1,5-benzodiazepine-2,4-[3H,5H]-dione and n-butylamine.

EXAMPLE 6

Using a procedure analogous to that described in Example 3, 3 - (amino-methylidene) - 5 - phenyl-7-chloro-1,5 - benzodiazepine - 2,4 - [3H,5H] - dione, M.P. 282–285° C., of the formula

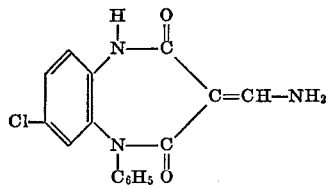

was prepared from 5 - phenyl - 7 - chloro-1H-1,5-benzodiazepine-2,4-[3H,5H]-dione.

EXAMPLE 7

Using a procedure analogous to that described in Example 1, 3 - (tert.butylamino-methylidene) - 5 - phenyl-7-chloro - 1,5 - benzodiazepine - 2,4 - [3H,5H] - dione, M.P. 255–256° C., of the formula

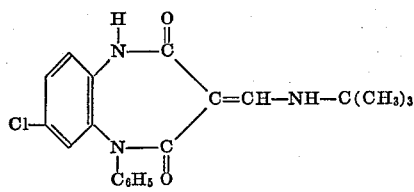

was prepared from 5 - phenyl - 7 - chloro-1H-1,5-benzodiazepine-2,4-[3H,5H]-dione and tert.butylamine.

EXAMPLE 8

Using a procedure analogous to that described in Example 1, 3-[(β-diethylamino-ethyl)-amino-methylidene]-5-phenyl - 7 - chloro - 1,5 - benzodiazepine - 2,4 - [3H, 5H]-dione, M.P. 282–285° C., of the formula

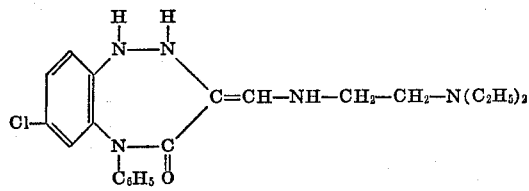

was prepared from 5 - phenyl - 7 - chloro-1H-1,5-benzodiazepine - 2,4 - [3H,5H] - dione and N,N-diethyl-ethylenediamine.

EXAMPLE 9

Using a procedure analogous to that described in Example 1, 3-(n-butylamino-methylidene)-5-phenyl-7-trifluoromethyl-1,5-benzodiazepine-2,4-[3H,5H]-dione, M.P. 155–156° C., of the formula

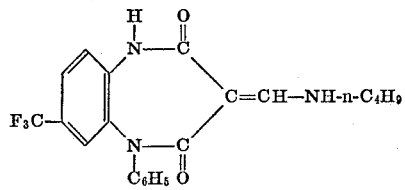

was prepared from 5-phenyl-7-trifluoromethyl-1H-1,5-benzodiazepine-2,4-[3H,5H]-dione and n-butylamine.

EXAMPLE 10

Using a procedure analogous to that described in Example 2, 3-(dimethylamino-methylidene)-5-phenyl-7-nitro-1,5-benzodiazepine-2,4-[3H,5H]-dione, M.P. 277° C., of the formula

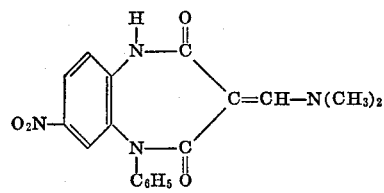

was prepared from 5-phenyl-7-nitro-1H-1,5-benzodiazepine-2,4-[3H,5H]-dione.

EXAMPLE 11

Using a procedure analogous to that described in Example 1, 3-(isobutylamino-methylidene)-5-phenyl-7-chloro-1,5-benzodiazepine-2,4-[3H,5H]-dione, M.P. 198–199° C., of the formula

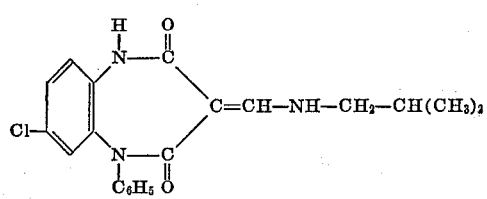

was prepared from 5-phenyl-7-chloro-1H-1,5-benzodiazepine-2,4-[3H,5H]-dione and isobutylamine.

EXAMPLE 12

Using a procedure analogous to that described in Example 1, 3-(n-butylamino-methylidene)-5-(o-fluorophenyl) - 7 - chloro - 1,5 - benzodiazepine-2,4-[3H,5H]-dione, M.P. 208° C., of the formula

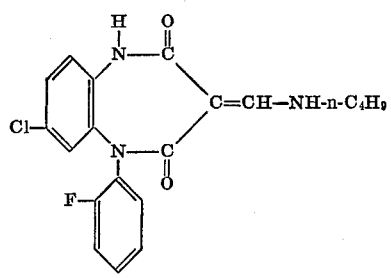

was prepared from 5-(o-fluoro-phenyl)-7-chloro-1H-1,5-benzodiazepine-2,4-[3H,5H]-dione and n-butylamine.

EXAMPLE 13

Using a procedure analogous to that described in Example 1, 3-(n-butylamino-methylidene)-5-(o-bromophenyl)-7-chloro-1,5-benzodiazepine-2,4-[3H,5H] - dione, M.P. 203° C., of the formula

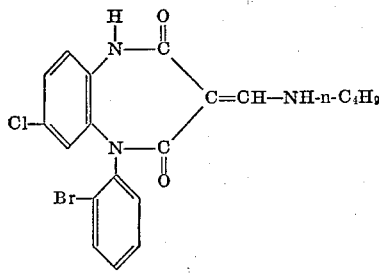

was prepared from 5-(o-bromo-phenyl)-7-chloro-1H-1,5-benzodiazepine-2,4-[3H,5H]-dione and n-butylamine.

EXAMPLE 14

Using a procedure analogous to that described in Example 1, 3-allylamino-methylidene)-5-phenyl-7-chloro-1,5-benzodiazepine-2,4-[3H,5H]-dione, M.P. 215–218° C., of the formula

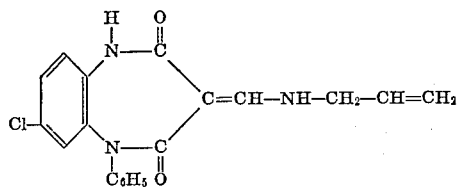

was prepared from 5-phenyl-7-chloro-1H-1,5-benzodiazepine-2,4-[3H,5H]-dione and allylamine.

EXAMPLE 15

Using a procedure analogous to that described in Example 1, 3-(n-butylamino-methylidene)-5-(o-trifluoromethylphenyl)-7-chloro-1,5-benzodiazepine-2,4-[3H,5H]-dione, M.P. 208–210° C., of the formula

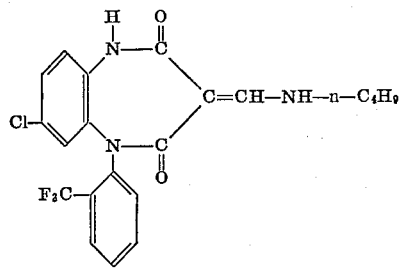

was prepared from 5-(o-trifluoromethyl-phenyl)-7-chloro-1H-1,5-benzodiazepine-2,4-[3H,5H]-dione and n-butylamine.

EXAMPLE 16

Using a procedure analogous to that described in Example 1, 3-(n-butylamino-methylidene)-5-(o-chlorophenyl)-7-chloro-1,5-benzodiazepine-2,4-[3H,5H] - dione, M.P. 208–210° C., of the formula

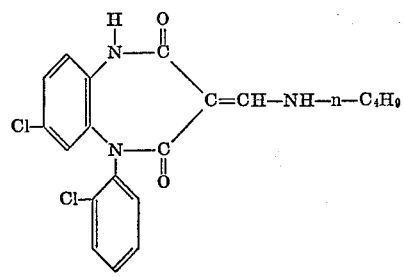

was prepared from 5-(o-chloro-phenyl)-7-chloro-1H-1,5-benzodiazepine-2,4-[3H,5H]-dione and n-butylamine.

EXAMPLE 17

Using a procedure analogous to that described in Example 1, 3 - (n-butylamino-methylidene)-5-(o-nitro-phenyl)-7-chloro-1,5-benzodiazepine-2,4-[3H,5H]-dione, M.P. 183° C., of the formula

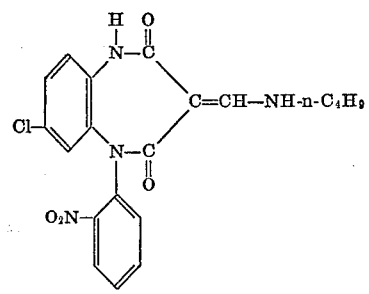

was prepared from 5-(o-nitro-phenyl)-7-chloro-1H-1,5-benzodiazepine-2,4-[3H,5H]-dione and n-butylamine.

Preparation of end products of the Formula I.

EXAMPLE 18

3-hydroxy-1-methyl-5-phenyl-7-trifluoromethyl-1H-1,5-benzodiazepine-2,4-[3H,5H]-dione by method C 18 gm. (0.05 mol) of 3-diazo-1-methyl-5-phenyl-7-trifluoromethyl - 1H-1,5-benzodiazepine-2,4-[3H,5H]-dione were dissolved in 100 ml. of acetonitrile, 10 ml. of water and 1 gm. of copper powder were added to the solution, and the resulting mixture was heated. Between 50 and 60° C. a distinct evolution of nitrogen occurred which subsided after about 15 minutes. Thereafter, the reaction mixture was vacuum-filtered through infusorial earth, the filtrate was evaporated, and the residue was recrystallized from dioxane, yielding 14 gm. (80% of theory) of the compound of the formula

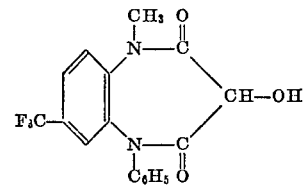

having a melting point of 245–248° C.

EXAMPLE 19

7-chloro-3-hydroxy-1-methyl-5-(α-pyridyl)-1H-1,5-benzodiazepine-2,4-[3H,5H]-dione by method C 55 gm. (0.25 mol) of 3-diazo-7-chloro-1-methyl-5-(α-pyridyl) - 1H-1,5-benzodiazepine-2,4-[3H,5H]-dione were added over a period of 15 minutes to a mixture consisting of 250 ml. of acetonitrile and 25 ml. of an aqueous 5% copper sulfate solution at 50 to 60° C., accompanied by stirring, whereby a vigorous evolution of nitrogen was released. The reaction mixture was then stirred for 30 minutes more and subsequently vacuum-filtered through infusorial earth while still hot. The filtrate was allowed to cool, the crystalline substance which separated out was collected by filtration, and the filtrate was evaporated. The residue was combined with the crystalline substance previously collected, and the mixture was recrystallized from methanol, yielding 5.9 gm. (75% of theory) of the compound of the formula

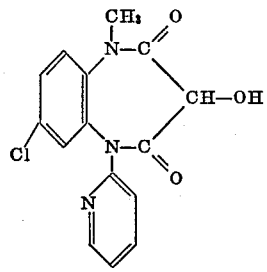

having a melting point of 204–206° C.

EXAMPLE 20

3-hydroxy-5-phenyl-7-trifluoromethyl-1H-1,5-benzodiazepine-2,4-[3H,5H]-dione by method B 15 gm. (0.04 mol) of 2-(n-butylamino-methylidene)-7-trifluoromethyl - 5-phenyl - 1H-1,5 - benzodiazepine-2,4-[3H,5H]-dione were dissolved in 2.5 liter of pure acetone, 200 ml. of aqueous 6% sulfuric acid were added to the solution, then a solution of 18 gm. of potassium permanganate in 400 ml. of water was added dropwise over a period of 20 minutes, and the resulting mixture stirred for one hour at —25 to —30° C. Thereafter, the reaction mixture was vacuum-filtered through infusorial earth, the major amount of the acetone was evaporated from the filtrate, the resulting concentrate was extracted with methylene chloride, the extract solution was dried with magnesium sulfate and then evaporated, and the residue was recrystallized from tetrahydrofuran, yielding 9.6 gm. (72% of theory) of the colorless crystalline compound of the formula

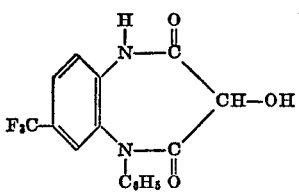

having a melting point of 260–264° C.

EXAMPLE 21

7-bromo-3-hydroxy-5-phenyl-1H-1,5-benzodiazepine-2,4-[3H,5H]-dione by method A 10 gm. (0.027 mol) of 7-bromo-3,3-dihydroxy-5-phenyl - 1H - 1,5-benzodiazepine-2,4-[3H,5H]-dione were dissolved in 150 ml. of glacial acetic acid, 12 gm. of zinc powder were added to the solution, and the resulting mixture was boiled for 30 minutes while stirring. Thereafter, the hot reaction mixture was vacuum-filtered through infusorial earth, the filter cake was washed with glacial acetic acid, the filtrate was admixed with about 600 ml. of ice water, and the aqueous mixture was allowed to stand for one hour. The crystalline substance which had separated out during that time was collected by vacuum filtration, washed with water, dried, and then recrystallized from ethanol, yielding 9.0 gm. (94% of theory) of the compound of the formula

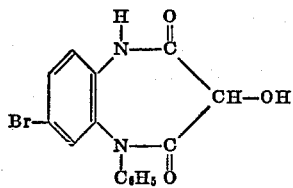

having a melting point of 264–266° C.

EXAMPLE 22

3-hydroxy-1-methyl-5-phenyl-7-trifluoromethyl-1H-1,5-benzodiazepine-2,4-[3H,5H]-dione 3.4 gm. of 3-hydroxy-1-methyl-5-phenyl-7-trifluoromethyl - 1H-1,5 - benzodiazepine-2,4-[3H,5H]-dione (see Example 20) were suspended in 200 ml. of tetrahydrofuran, the suspension was admixed with 500 mgm. of a 50% dispersion of sodium hydride in tetrahydrofuran, and the resulting mixture was stirred for about 30 minutes. Thereafter, 20 ml. of methyl iodide were added, the mixture was stirred for 5 hours at room temperature and then evaporated, and the residue was taken up in methylene chloride. The resulting solution was washed with water, dried and evaporated, and the residue was recrystallized from methanol, yielding 2.9 gm. (78% of theory) of a compound having a melting point of 245–248° C. which was identical to the end product of Example 18.

EXAMPLE 23

Using a procedure analogous to that described in Example 19, 1-methyl-3-hydroxy-5-phenyl-7-chloro-1H-1,5-benzodiazepine-2,4-[3H,5H]-dione, M.P. 262–264° C., of the formula

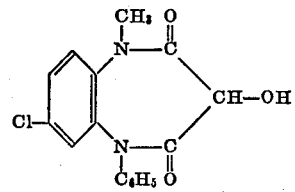

was prepared from 1-methyl-3-diazo-5-phenyl-7-chloro-1H-1,5-benzodiazepine-2,4-[3H,5H]-dione.

EXAMPLE 24

Using a procedure analogous to that described in Example 19, 1-ethyl-3-hydroxy-5-phenyl-7-bromo-1H-1,5-benzodiazepine-2,4-[3H,5H]-dione, M.P. 256–257° C., of the formula

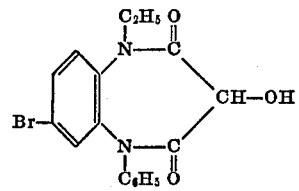

was prepared from 1-ethyl-3-diazo-5-phenyl-7-bromo-1H-1,5-benzodiazepine-2,4-[3H,5H]-dione.

EXAMPLE 25

Using a procedure analogous to that described in Example 19, 1-methyl-3-hydroxy-5-phenyl-7-bromo-1H-1,5-benzodiazepine-2,4-[3H,5H]-dione, M.P. 269–271° C., was prepared from 1-methyl-3-diazo-5-phenyl-7-bromo-1H-1,5-benzodiazepine-2,4-[3H,5H]-dione.

EXAMPLE 26

Using a procedure analogous to that described in Example 19, 1-methyl-3-hydroxy-5-phenyl-7-fluoro-1H-1,5-benzodiazepine-2,4-[3H,5H]-dione, M.P. 255–258° C., was prepared from 1-methyl-3-diazo-5-phenyl-7-fluoro-1H-1,5-benzodiazepine-2,4-[3H,5H]-dione.

EXAMPLE 27

Using a procedure analogous to that described in Example 19, 1-methyl-3-hydroxy-5-phenyl-7-nitro-1H-1,5-benzodiazepine-2,4-[3H,5H]-dione, M.P. 250–252° C., of the formula

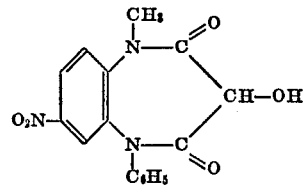

was prepared from 1-methyl-3-diazo-5-phenyl-7-nitro-1H-1,5-benzodiazepine-2,4-[3H,5H]-dione.

EXAMPLE 28

Using a procedure analogous to that described in Example 22, 1-methyl-3-hydroxy-5-(o-trifluoromethyl-phenyl)-7-chloro-1H-1,5-benzodiazepine-2,4-[3H,5H] - dione, M.P. 260–262° C., of the formula

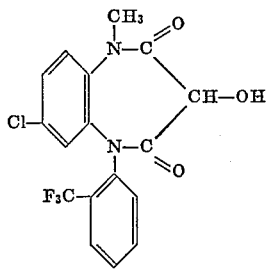

was prepared from 3 - hydroxy - 5 - (o-trifluoromethyl-phenyl) - 7 - chloro-1H-1,5-benzodiazepine-2,4-[3H,5H]-dione (see Example 40) and methyl iodide.

EXAMPLE 29

Using a procedure analogous to that described in Example 18, 1-methyl-3-hydroxy-5-(o-nitro-phenyl)-7-trifluoromethyl-1H-1,5-benzodiazepine-2,4-[3H,5H] - dione, M.P. 189–190° C., of the formula

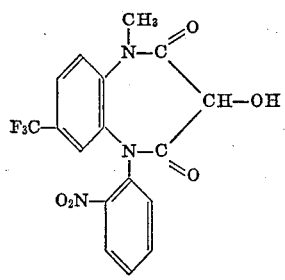

was prepared from 1-methyl-3-diazo-5-(o-nitro-phenyl)-7-trifluoromethyl - 1H - 1,5 - benzodiazepine-2,4-[3H,5H]-dione.

EXAMPLE 30

Using a procedure analogous to that described in Example 18, 1-methyl-3-hydroxy-5-(o-fluoro-phenyl)-7-trifluoromethyl-1H-1,5-benzodiazepine-2,4-[3H,5H] - dione, M.P. 195–197° C., of the formula

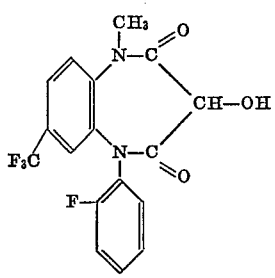

was prepared from 1-methyl-3-diazo-5-(o-fluoro-phenyl)-7-trifluoromethyl-1H-1,5-benzodiazepine - 2,4 - [3H,5H]-dione.

EXAMPLE 31

Using a procedure analogous to that described in Example 19, 1-methyl-3-hydroxy-5-(α-pyridyl)-7-bromo-1H-1,5-benzodiazepine-2,4-[3H,5H]-dione, M.P. 218–220° C., of the formula

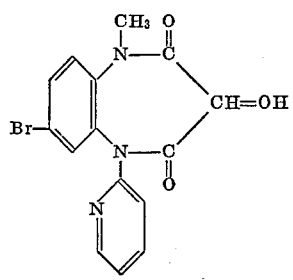

was prepared from 1-methyl-3-diazo-5-(α-pyridyl)-7-bromo-1H-1,5-benzodiazepine-2,4-[3H,5H]-dione.

EXAMPLE 32

Using a procedure analogous to that described in Example 18, 1-methyl-3-hydroxy-5-(o-chloro-phenyl)-7-trifluoromethyl-1H-1,5-benzodiazepine-2,4-[3H,5H] - dione, M.P. 188–190° C., of the formula

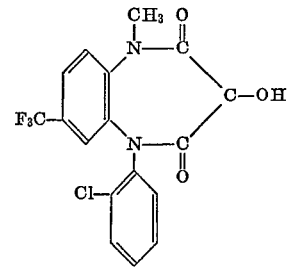

was prepared from 1-methyl-3-diazo-5-(o-chloro-phenyl)-7-trifluoromethyl-1H-1,5-benzodiazepine - 2,4 - [3H,5H]-dione.

EXAMPLE 33

Using a procedure analogous to that described in Example 18, 1-allyl-3-hydroxy-5-phenyl-7 - trifluoromethyl-1H-1,5-benzodiazepine-2,4-[3H,5H] - dione, M.P. 178–180° C., of the formula

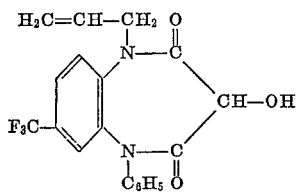

was prepared from 1-allyl-3-diazo-5-phenyl-7 - trifluoromethyl-1H-1,5-benzodiazepine-2,4-[3H,5H]-dione.

EXAMPLE 34

Using a procedure analogous to that described in Example 19, 1-methyl-3-hydroxy-5-(o-bromo - phenyl) - 7-chloro-1H-1,5-benzodiazepine-2,4-[3H,5H] - dione, M.P. 253° C., of the formula

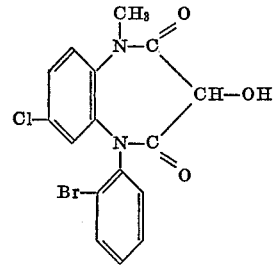

was prepared from 1-methyl-3-diazo-5-(o-bromo-phenyl)-7-chloro-1H-1,5-benzodiazepine-2,4-[3H,5H]-dione.

EXAMPLE 35

Using a procedure analogous to that described in Example 18, 1-isopropyl-3-hydroxy-5-phenyl - 7 - trifluoromethyl-1H-1,5-benzodiazepine-2,4-[3H,5H] - dione, M.P. 201–203° C., of the formula

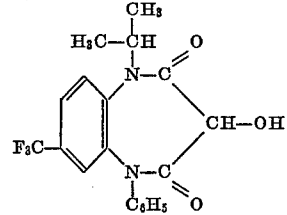

was prepared from 1-isopropyl-3-diazo-5-phenyl - 7 - trifluoromethyl-1H-1,5-benzodiazepine-2,4-[3H,5H]-dione.

EXAMPLE 36

Using a procedure analogous to that described in Example 18, 1-ethyl-3-hydroxy-5-phenyl-7-trifluoromethyl-1H-1,5-benzodiazepine-2,4-[3H,5H] - dione, M.P. 235–236° C., was prepared from 1-ethyl-3-diazo-5-phenyl-7-trifluoromethyl-1H-1,5-benzodiazepine - 2,4 - [3H,5H]-dione.

EXAMPLE 37

Using a procedure analogous to that described in Example 18, 1-(β-hydroxy-ethyl)-3-hydroxy-5-phenyl-7-trifluoromethyl-1H-1,5-benzodiazepine-2,4-[3H,5H] - dione, M.P. 217–219° C., of the formula

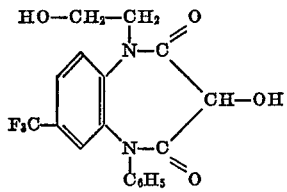

was prepared from 1-(β-hydroxy-ethyl)-3-diazo-5-phenyl-7-trifluoromethyl-1H-1,5-benzodiazepine - 2,4 - [3H,5H]-dione.

EXAMPLE 38

Using a procedure analogous to that described in Example 20, 3-hydroxy-5-phenyl-7-chloro-1H - 1,5 - benzodiazepine-2,4-[3H,5H]-dione, M.P. 278–280° C. (decomp.), was prepared from 3-(methylamino-methylidene)-5-phenyl-7-chloro-1H-1,5-benzodiazepine - 2,4 - [3H,5H]-dione.

EXAMPLE 39

Using a procedure analogous to that described in Example 18, 1-methyl-3-hydroxy-5-(m-fluoro-phenyl)-7-trifluoromethyl-1H-1,5-benzodiazepine-2,4-[3H,5H] - dione, M.P. 188–189° C., of the formula

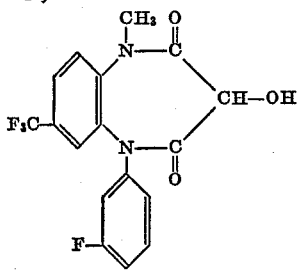

was prepared from 1-methyl-3-diazo-5-(m-fluoro-phenyl)-7-trifluoromethyl-1H-1,5-benzodiazepine - 2,4 - [3H,5H]-dione.

EXAMPLE 40

Using a procedure analogous to that described in Example 20, 3-hydroxy-5-(o-trifluoromethyl - phenyl) - 7-chloro-1H-1,5-benzodiazepine-2,4-[3H,5H] - dione, M.P. 281–282° C., was prepared from 3-(n-butylamino-methylidene)-5-(o-trifluoromethyl-phenyl)-7-chloro - 1H - 1,5-benzodiazepine-2,4-[3H,5H]-dione.

EXAMPLE 41

Using a procedure analogous to that described in Example 18, 1-methyl-3-hydroxy-5 - (m - trifluoromethyl-phenyl)-7-trifluoromethyl-1H-1,5 - benzodiazepine - 2,4-[3H,5H]-dione, M.P. 187–188° C., of the formula

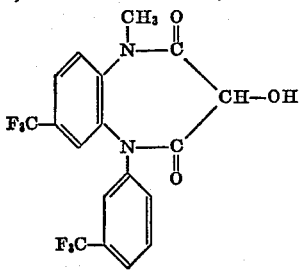

was prepared from 1-methyl-3-diazo-5-(m-trifluoromethyl-phenyl) - 7 - trifluoromethyl-1H-1,5-benzodiazepine-2,4-[3H,5H]-dione.

EXAMPLE 42

Using a procedure analogous to that described in Example 18, 1-methyl - 3 - hydroxy-5-(m-nitro-phenyl)-7-trifluoromethyl - 1H - 1,5-benzodiazepine-2,4-[3H,5H]-dione, M.P. 230–233° C., of the formula

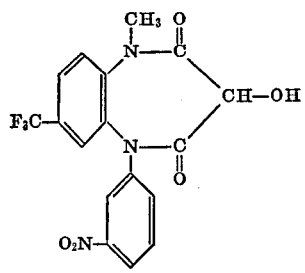

was prepared from 1-methyl-3-diazo-5-(m-nitro-phenyl)-7-trifluoromethyl-1H-1,5 - benzodiazepine - 2,4 - [3H,5H]-dione.

EXAMPLE 43

Using a procedure analogous to that described in Example 18, 1-methyl - 3 - hydroxy-5-(p-chloro-phenyl)-7-trifluoromethyl - 1H - 1,5 - benzodiazepine-2,4-[3H,5H]-dione, M.P. 239–241° C., of the formula

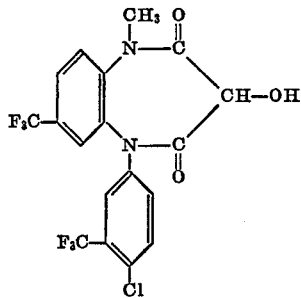

was prepared from 1-methyl - 3 - diazo-5-(p-chloro-phenyl) - 7 - trifluoromethyl-1H-1,5-benzodiazepine-2,4-[3H,5H]-dione.

EXAMPLE 44

Using a procedure analogous to that described in Example 20, 3-hydroxy-1-methyl-5-phenyl-7-trifluoromethyl-1H-1,5-benzodiazepine - 2,4 - [3H,5H]-dione was prepared from 3-dimethylamino-methylidene)-1-methyl-5-phenyl-7-trifluoromethyl - 1H - 1,5-benzodiazepine-2,4-[3H,5H]dione.

The starting compound was prepared as follows:

5 gm. of 3-(dimethylamino-methylidene)-5-phenyl-7-trifluoromethyl - 1H - 1,5-benzodiazepine - 2,4-[3H,5H]-dione were dissolved in 60 ml. of N,N-dimethyl-acetamide, 2.5 gm. of sodium methylate were added to the solution, and the mixture was stirred for two hours at room temperature. Thereafter, while cooling, 8 ml. of methyl iodide were added, and the mixture was stirred overnight at room temperature. Subsequently, the major amount of dimethyl-acetamide was evaporated in vacuo, the residue was admixed with water, the aqueous mixture was vacuum-filtered, the filter cake was washed with water and dissolved in ethyl acetate, the resulting solution was extracted with water, and the organic phase was dried over magnesium sulfate and then vacuum-filtered through infusorial earth in the presence of activated charcoal. The filtrate was then evaporated, and the residue was recrystallized from a small amount of acetone/ ether, yielding 4.0 gm. (76% of theory) of the compound of the formula

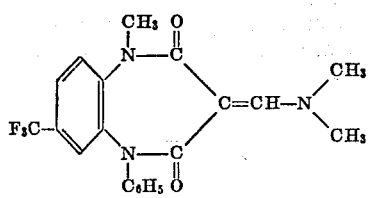

having a melting point or 164–166° C.

EXAMPLE 45

Using a procedure analogous to that described in Example 20, 3-hydroxy - 1 - ethyl-5-phenyl-7-bromo-1H-1,5-benzodiazepine - 2,4 - [3H,5H]-dione was prepared from 3-(n-butylamino-methylidene) - 1 - ethyl 5-phenyl-7 - bromo - 1H - 1,5-benzodiazepine-2,4-[3H,5H]-dione (obtained by ethylating the end product of Example 1 with ethyl iodide).

EXAMPLE 46

Using a procedure analogous to that described in Example 20, 3-hydroxy - 1 - methyl-5-phenyl-7-bromo-1H-1,5-benzodiazepine-2,4-[3H,5H]-dione was prepared from 3-(n-butylamino-methylidene) - 1 - methyl-5-phenyl-7-bromo-1H-1,5 - benzodiazepine - 2,4 - [3H,5H]-dione obtained by methylating the end product of Example 1 with methyl iodide).

EXAMPLE 47

Using a procedure analogous to that described in Example 20, 3-hydroxy-1-methyl-5-((o-fluoro-phenyl)-7-trifluoromethyl - 1H - 1,5-benzodiazepine - 2,4 - [3H,5H]-dione was prepared from 3-(n-butylamino-methylidene)-1-methyl-5-(o-fluoro-phenyl) - 7 - trifluoromethyl-1H-1,5-benzodiazepine-2,4-[3H,5H]-dione.

The compounds according to the present invention, that is, those embraced by Formula I above, have useful pharmacodynamic properties. More particularly, the compounds of the instant invention exhibit tranquilizing and anticonvulsive activities in warm-blooded animals, such as mice, rats, dogs and minks; their rate of elimination from the body is substantially more rapid than that of presently available tranquilizers, whereby the incidence of possible chronic side-effects is avoided.

Especially effective are those compounds of the Formula I wherein $R_1$ is hydrogen, methyl or ethyl, $R_2$ is phenyl, o-trifluoromethyl-phenyl or α-pyridyl, and $R_3$ is chlorine, bromine or trifluoromethyl.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective tranquilizing and anticonvulsive dosage unit of the compounds according to the present invention is from 0.0083 to 0.84 mgm./kg. body weight, preferably 0.0166 to 0.42 mgm./kg. body weight, and the daily dose rate is 0.083 to 2.5 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 48

Coated pills

The pill core composition is compounded from the following ingredients:

| | Parts |
|---|---|
| 3-hydroxy - 5 - (o-trifluoromethyl-phenyl)-7-chloro-1H-1,5-benzodiazepine-2,4-[3H,5H]-dione | 10.0 |
| Lactose | 37.5 |
| Corn starch | 25.0 |
| Gelatin | 2.0 |
| Magnesium stearate | 0.5 |
| Total | 75.0 |

Preparation

The benzodiazepine-dione compound is intimately admixed with the lactose and the corn starch, the mixture is moistened with an aqueous 10%! solution of the gelatin, the moist mass is forced through a 1 mm.-mesh screen, the resulting granulate is dried at 40° C. and again passed through the screen, the dry granulate is admixed with the magnesium stearate, the composition is compressed into 75 mgm.-pill cores which are subsequently coated in conventional manner with a thin shell consisting essentially of a mixture of sugar, titanium dioxide, talcum and gum arabic, and the coated pills are polished with beeswax. Each pill contains 10 mgm. of the benzodiazepine-dione compound and is an oral dosage unit composition with effective tranquilizing and anticonvulsive actions.

The same result in obtained when the benzodiazepine-dione compound in the above composition is replaced by one of the following compounds:

3-hydroxy-1-methyl-5-phenyl-7-trifluoromethyl-1H-1,5-benzodiazepine-2,4-[3H,5H]-dione;

7-bromo-3-hydroxy-1-methyl-5-phenyl-1H-1,5-benzodiazepine-2,4-[3H,5H]-dione; or 5-(o-fluoro-phenyl)-3-hydroxy-1-methyl-7-trifluoromethyl-1H-1,5-benzodiazepine-2,4-[3H,5H]-dione.

EXAMPLE 49

Suppositories

The suppository composition is compounded from the following ingredients:

| | Parts |
|---|---|
| 3-hydroxy-5-(o-trifluoromethyl-phenyl) - 7 - chloro-1H-1,5-benzodiazepine-2,4-[3H,5H]-dione | 10 |
| Suppository base (e.g. cocoa butter) | 1690 |
| Total | 1700 |

Preparation

The finely pulverized benzodiazepine-dione compound is blended with the aid of an immersion homogenizer into the suppository base which had previously been melted and cooled to 40° C. 1700 mgm.-portions of the composition are poured at 35° C. into cooled suppository molds and allowed to harden therein. Each suppository contains 10 mgm. of the benzodiazepine-dione compound and is a rectal dosage unit composition with effective tranquilizing and anticonvulsive actions.

Analogous results are obtained when any one of the other benzodiazepine-diones embraced by Formula I is substituted for the particular benzodiazepine-dione in Examples 48 and 49. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

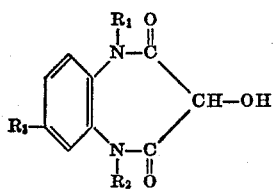

wherein
- $R_1$ is hydrogen, straight or branched alkyl of 1 to 4 carbon atoms, ω-hydroxy-(alkyl of 1 to 4 carbon atoms) or allyl,
- $R_2$ is phenyl, halo-phenyl, trifluoromethyl-phenyl, nitro-phenyl or pyridyl, and
- $R_3$ is chlorine, bromine, fluorine, trifluoromethyl or nitro.

2. A compound according to claim 1, wherein
- $R_1$ is hydrogen, methyl or ethyl,
- $R_2$ is phenyl, o-trifluoromethyl-phenyl or α-pyridyl, and
- $R_3$ is chlorine, bromine or trifluoromethyl.

3. A compound according to claim 2, which is 3-hydroxy-1-methyl-5-phenyl - 7 - chloro-1H,1,5-benzodiazepine-2,4-[3H,5H]-dione.

4. A compound according to claim 2, which is 3-hydroxy-5-(o-trifluoromethyl-phenyl) - 7 - chloro-1H-1,5-benzodiazepine-2,4-[3H,5H]-dione.

5. A compound according to claim 2, which is 7-chloro-3-hydroxy-1-methyl - 5 - (o-trifluoromethyl-phenyl)-1H-1,5-benzodiazepine-2,4-[3H,5H]-dione.

6. A compound according to claim 2, which is 7-bromo-3-hydroxy - 1 - methyl - 5 - (α-pyridyl)-1H-1,5-benzodiazepine-2,4-[3H,5H]-dione.

7. The process for the preparation of a compound according to claim 1, which comprises reducing a compound of the formula

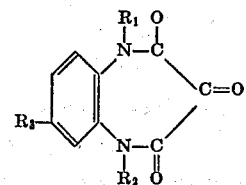

wherein $R_1$, $R_2$ and $R_3$ have the same meanings as in claim 1, or a hydrate thereof, with nascent hydrogen, by catalytic hydrogenation or with sodium borohydride.

8. The process according to claim 7, wherein the reduction is effected with nascent hydrogen generated by a mixture of zinc and glacial acetic acid or a mixture of tin and hydrochloric acid.

References Cited

UNITED STATES PATENTS 3,660,381   5/1972   Weber et al. _____ 260—239.3 B

HENRY R. JILES, Primary Examiner

R. T. BOND, Assistant Examiner

U.S. Cl. X.R.

424—244, 263

PO-1050
(5/69)

UNITED STATES PATENT OFFICE
CERTIFICATE OF CORRECTION

Patent No. 3,707,538                     Dated December 26, 1972

Inventor(s) KARL-HEINZ WEBER, ADOLF BAUER, PETER DANNEBERG, KLAUS MINCK and KARL HEINZ POOK It is certified that error appears in the above-identified patent and that said Letters Patent are hereby corrected as shown below:

Column 7, in the last formula: "H-N" (second occurrence) should read -- C-O --.

Column 16, in the second formula: correct that portion of the formula which reads

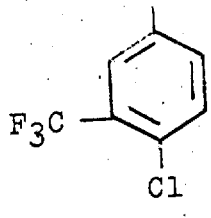

to read

Signed and sealed this 3rd day of July 1973.

(SEAL)
Attest:

EDWARD M. FLETCHER, JR.
Attesting Officer

Rene Tegtmeyer
Acting Commissioner of Patents